United States Patent [19]

Duffy

[11] Patent Number: 4,742,883
[45] Date of Patent: May 10, 1988

[54] PINION BALL BEARINGS WITH PRELOAD ADJUSTMENT FOR POWER RACK AND PINION STEERING GEARS

[75] Inventor: James J. Duffy, Livonia, Mich.

[73] Assignee: Ford Motor Company, Dearborn, Mich.

[21] Appl. No.: 912,483

[22] Filed: Sep. 29, 1986

[51] Int. Cl.[4] .............................................. B62D 3/12
[52] U.S. Cl. ..................................... 180/148; 74/422; 74/498; 91/375 A
[58] Field of Search .................. 91/375 A, 375 R; 137/625.24; 180/143, 148, 132; 74/422, 498

[56] References Cited

U.S. PATENT DOCUMENTS

| | | | |
|---|---|---|---|
| 4,117,864 | 10/1978 | Taig | 91/375 R X |
| 4,516,471 | 5/1985 | Duffy | 91/375 |
| 4,615,408 | 10/1986 | Cordiano | 180/148 |

Primary Examiner—John J. Love
Assistant Examiner—Mitchell J. Hill
Attorney, Agent, or Firm—Donald J. Harrington; Keith L. Zerschling

[57] ABSTRACT

A rack and pinion power steering gear mechanism having a driving pinion connected to a driver controlled steering shaft through a torsion rod, a gear rack engageable with the pinion and connected to steering gear linkage members, a fluid motor having a movable piston connected to the rack, a steering valve comprising a valve sleeve connected to the pinion, an inner valve member in the sleeve connected to the steering shaft, and a pressure distributor fluid circuit connecting opposed side of the motor to the steering valve whereby pressure is distributed selectively to one side or the other of the piston to provide a power assist during steering maneuvers.

2 Claims, 4 Drawing Sheets

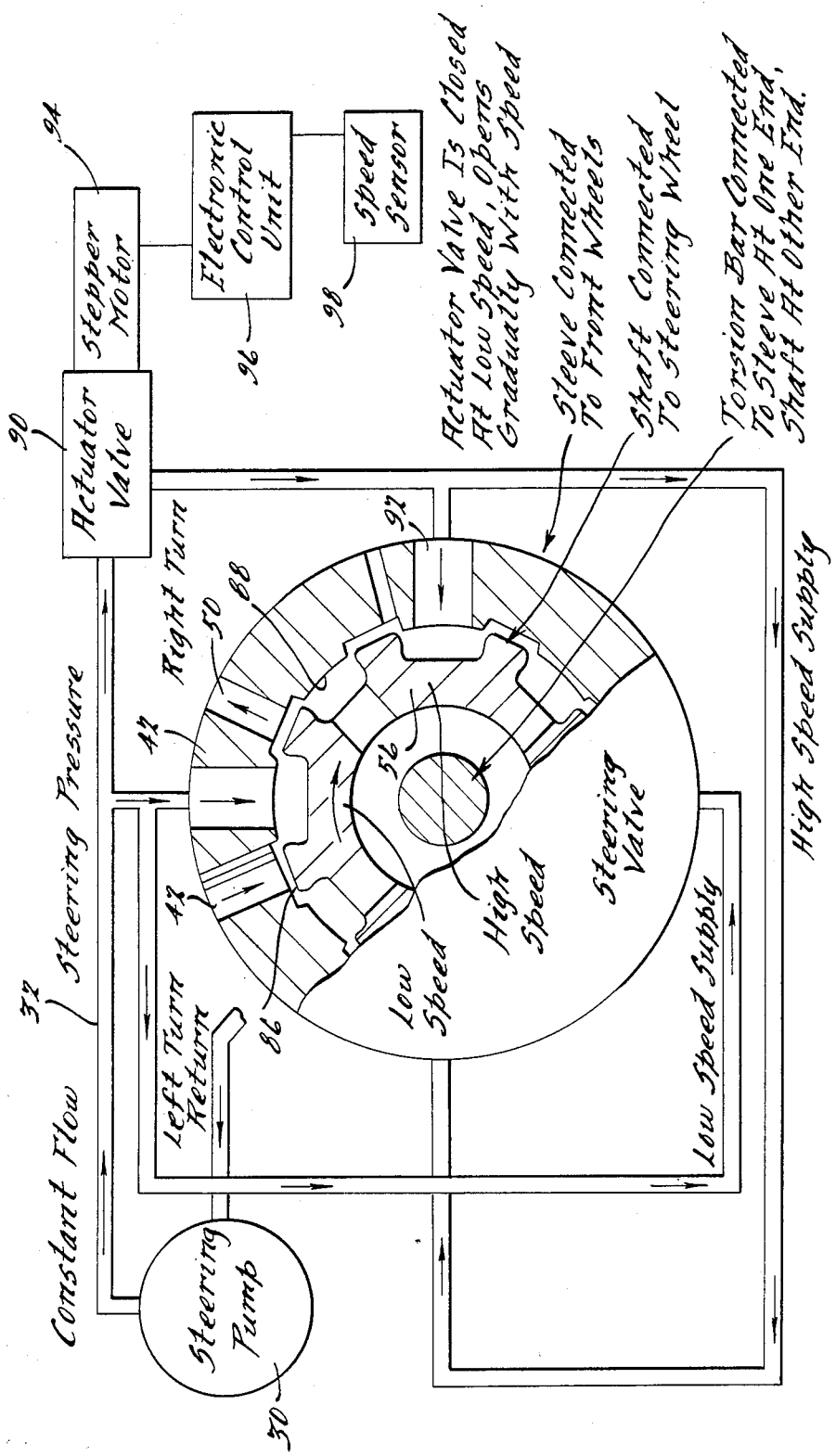

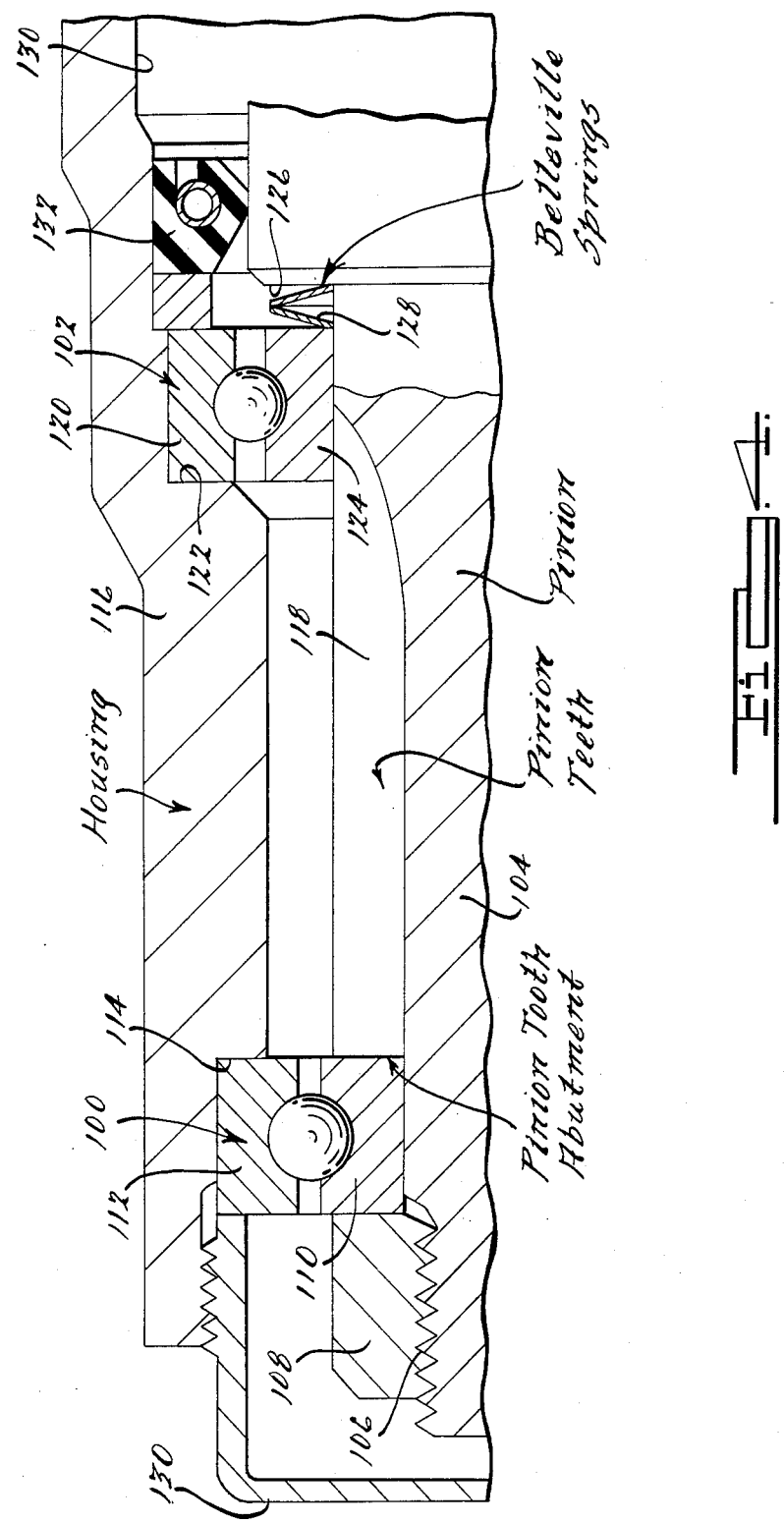

PINION BALL BEARINGS WITH PRELOAD ADJUSTMENT FOR POWER RACK AND PINION STEERING GEARS

BACKGROUND OF THE INVENTION

My invention comprises an improvement in a rack and pinion steering gear system of the kind shown, for example, in my U.S. Pat. No. 4,516,471. That patent describes a rack and pinion steering gear having a rack that is connected to the steering linkage of an automotive vehicle and a driving pinion under the control of the vehicle operator. The pinion actuates the rack in the direction of its axis. It is mounted in a steering gear housing by means of spaced bearings, and it is keyed or otherwise connected mechanically to the valve sleeve of a rotary valve mechanism. An inner valve member of the prior art system described in the U.S. Pat. No 4,516,471 is received in a valve sleeve and the inner valve member and sleeve are ported to provide a controlled flow of fluid pressure from a power steering pump to fluid flow passages that are adapted to distribute working pressure to either side of a piston for a fluid motor. The working piston of the fluid motor is connected to the rack and provides a fluid pressure assist during steering maneuvers.

A driver controlled steering shaft in prior art steering systems of this kind is connected to the pinion through a torsion rod which deflects under steering wheel torque. The inner valve member is connected directly to the steering shaft. Thus when torque is applied to the steering wheel and shaft, the inner valve member is displaced angularly with respect to the valve sleeve, thereby providing appropriate pressure distribution to the opposed sides of the motor piston.

It is conventional practice to straddle mount the pinion in the steering gear housing. The outboard end of the pinion disclosed in U.S. Pat. No. 4,516,471 is a ball bearing and the inboard side of the pinion is a fixed bushing. Gear tooth loads in such designs are transmitted from the pinion to the rack, thereby establishing a radial force vector that tends to displace the pinion in a direction transverse to its axis of oscillation.

GENERAL DESCRIPTION OF THE INVENTION

My present invention eliminates the possibility of radial lash in the pinion caused by tooth forces due to the tooth loading of the pinion and the rack teeth. If lash occurs, a side load on the valve sleeve would be created which increases the friction between the valve sleeve and the inner valve member. In extreme cases this may cause valve sticking, but in any event it creates a condition that tends to decrease the sensitivity of the valve to steering efforts of the vehicle operator.

The elimination of lash of the pinion which contributes to side loads on the valve sleeve is a significant feature of the improvement of my present invention. My present invention includes pinion ball bearings straddle mounted on either side of the rack. Provision is made for preloading the ball bearings and for maintaining precise concentricity of the axis of the pinion with respect to the axis of the valve sleeve regardless of the magnitude of the gear tooth forces at the mesh between the rack teeth and the pinion teeth.

BRIEF DESCRIPTION OF THE FIGURES OF THE DRAWINGS

FIG. 3 is a schematic representation of the rotary steering valve assembly. It is a cross sectional view taken along the plane of section line 3—3 of FIG. 2.

FIG. 4 is a partial cross section view of a power steering gear mechanism employing the improved pinion ball bearing mounting mechanism of my invention.

PARTICULAR DESCRIPTION OF THE INVENTION

Figure 1:
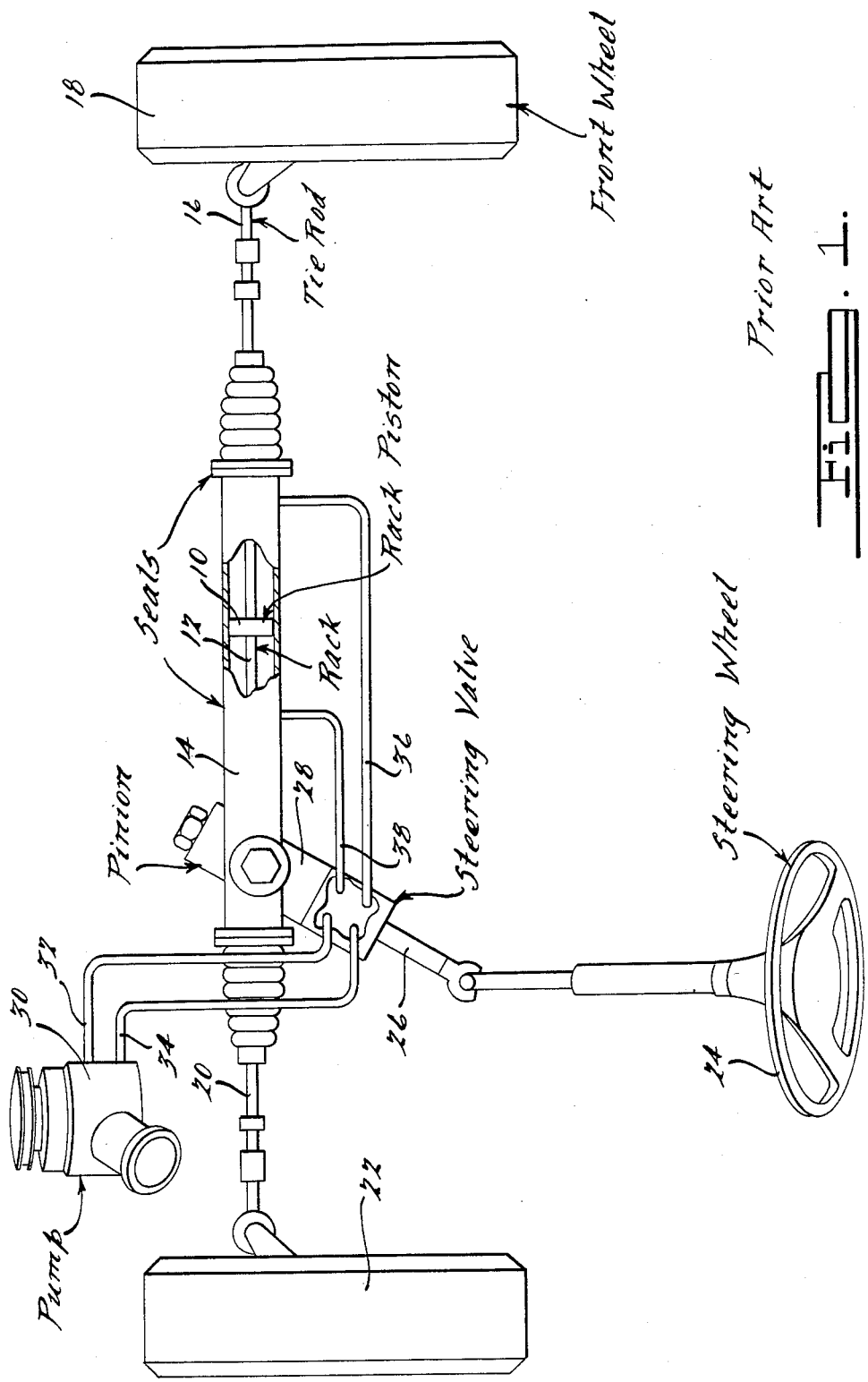
FIG. 1 shows in schematic form a conventional power rack and pinion steering system of the kind presently used, for example, in vehicles manufactured by Ford Motor Company. It illustrates a rack and pinion type power steering gear mechanism in the steering linkage for the wheels of a road vehicle.

A conventional power steering gear mechanism is shown in FIG. 1. It includes a rack piston 10, a gear rack 12 which forms part of the piston 10 and a fluid pressure cylinder 14 which forms a part of the fluid motor of which piston 10 is a part.

The rack 12 is connected at one end to a first steering tie rod 16 for a dirigible wheel 18. The opposite end of the rack is connected to the tie rod 20 for a second dirigible wheel 22. Steering wheel 24 is connected to a steering shaft 26. A steering gear housing 28 receives the steering shaft as will be explained with reference to FIG. 2.

The steering valve which is located in the housing 28 is supplied with pressurized fluid from positive displacement pump 30 through pressure passage 32. A flow return passage is shown at 34. Pressure is distributed to either side of the piston 10 through right steering pressure passage 36 and left steering pressure passage 38.

Figure 2:
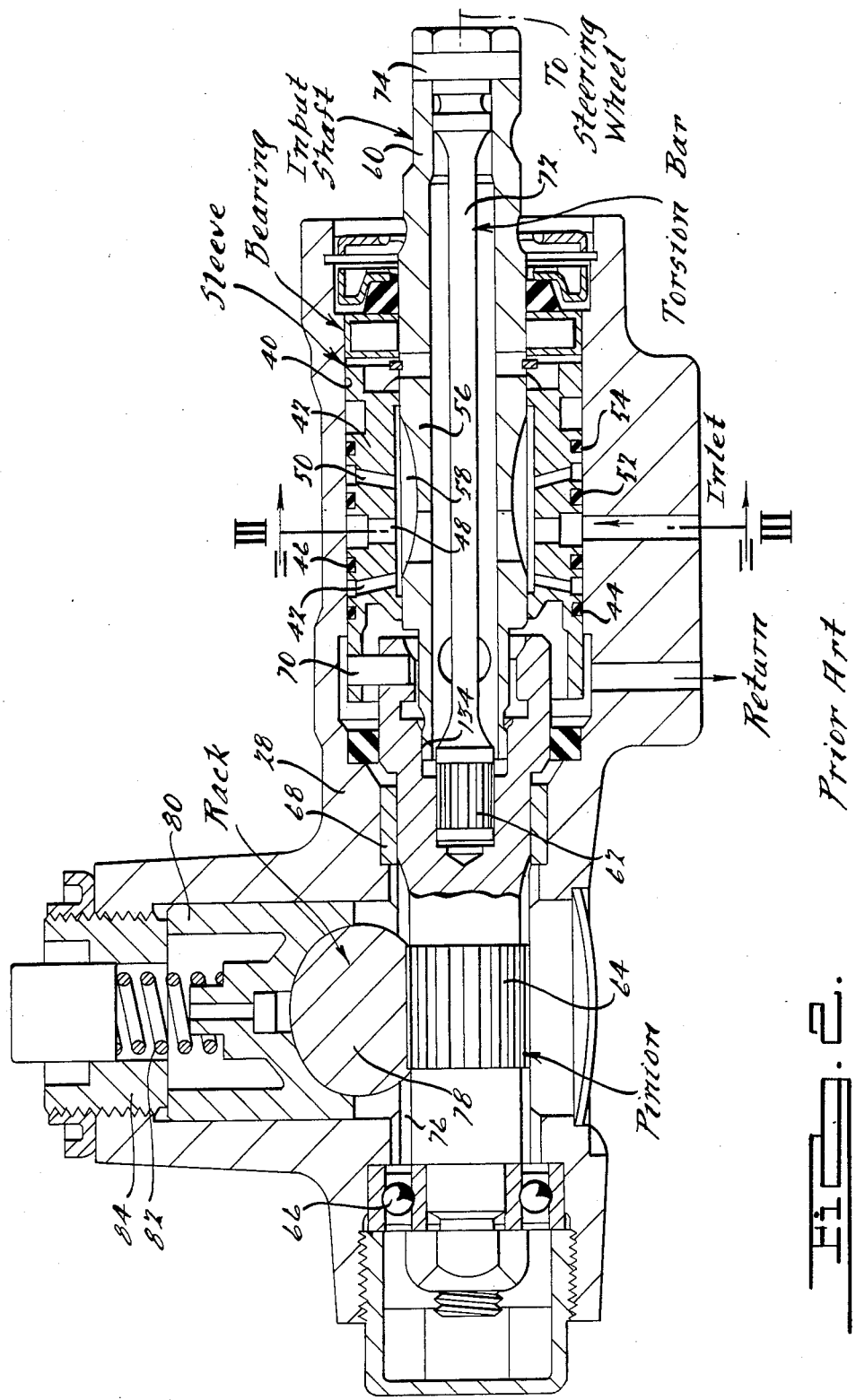
FIG. 2 is a cross sectional view of a power steering gear mechanism of the kind used in the assembly of FIG. 1. It includes a conventional bushing at the inborad end of the pinion with no provision for compensating for lash created by the separating forces at the mesh between the rack teeth and the pinion teeth.

FIG. 2 shows the housing 28 in cross section. It is provided with a valve opening 40 which receives valve sleeve 42. Left turn port 43 is located between seal rings 44 and 46 on the left side of inlet port 48 in sleeve 42. Right hand steering pressure port 50 is located on the right hand side of inlet port 48 between sleeve seal rings 52 and 54. Rotatably mounted in sleeve 42 is valve member 56 which has valve lands 58 formed about its periphery. These lands register with cooperating internal lands formed in the sleeve 42. Inner valve member 56 forms a part of or is connected to torque input shaft 60, which is splined or otherwise connected to the steering shaft 26 identified in FIG. 1.

Shaft 60 is splined at 62 to steering pinion 64 straddle mounted in the left hand side of the housing 28 by ball bearing 66 and bushing 68.

The right hand end of the pinion 64 is pinned or otherwise connected positively to the left hand end of the sleeve 42, the pin connection being shown at 70.

When torque is applied to the shaft 60, that torque is distributed to the pinion through torsion rod 72, which is pinned at 74 to the shaft 60. This causes torsion rod 82 to deflect. Thus the inner valve member 66 is adjusted angularly with respect to the sleeve 42 thereby providing a flow metering action between the internal lands of the sleeve 42 and the lands 58 of the valve 56.

Pinion 64 is formed with rack pinion teeth 76, which mesh with rack teeth formed in the rack bar 78.

A yoke 80 slidably contacts the rack bar 78. It is urged into engagement with the rack bar by yoke spring 82. A threaded lug 84 forms the seat for the spring 80.

The valve system of FIG. 3 is a rotary valve assembly of the kind shown in my U.S. Pat. No. 4,561,521 rather than a valve of the kind shown in my U.S. Pat. No. 4,516,471. Reference may be made to the description of the valve system of U.S. Pat. No. 4,561,521 to supplement the present disclosure. It comprises in general valve sleeve 42 and inner valve member 56. Inner valve member 56 has external valve lands 86 and valve sleeve 32 has internal valve lands 88. The flow circuit from pump 30 through the valve system to the steering pressure passages is shown. Fluid passes from the steering pressure passage 32 through the spaces between the valve lands to either the right turn port 50 or the left turn port 42. At high speeds fluid is bypassed through actuator valve 90 to the high speed port 92. At low speeds a stepper motor 94 restricts or blocks the flow from stepper pressure passage 32 to the port 92 and the stepper motor in turn is under control of an electronic control module 96. The module 96 receives the speed signal from speed sensor 98 which measures the vehicle velocity.

My present invention does not include a pinion mounting arrangement like that shown in the prior art FIG. 2 arrangement nor in FIG. 2 of U.S. Pat. No. 4,516,471. Instead I have provided a straddle mounted bearing arrangement for the pinion which comprises ball bearing 100 and a second ball bearing 102 located at the inboard side of the pinion 104. Pinion 104 is threaded at 106 to accommodate an adjusting nut 108. That nut engages the inner race 110 of bearing 100. The outer race 112 of bearing 100 engages a shoulder 114 on the housing 116.

The pinion 104 is provided with pinion teeth 118 which correspond to pinion teeth 76 of FIG. 2. Bearings 100 and 102 are located at the axial ends of the pinion teeth.

The outer race 120 of bearing 102 engages shoulder 122 of the housing 116. The inner race 124 is separated from shoulder 126 formed on the pinion and the separation receives a pair of Belleville springs 128. These springs provide a preload bearing adjustment force on the race 124 when adjusting nut 108 is threaded during the assembly operation. A dust cap 131 closes the left end of the housing as shown.

The right end of the pinion is sealed with respect to the valve sleeve opening 130 by fluid seal 132.

When the nut 108 is appropriately adjusted, a bearing preload is applied to the bearings by the Belleville springs thereby eliminating any possibility of radial lash of the pinion with respect to the housing. Thus perfect concentricity is maintained for the valve sleeve. The inner valve member which is piloted in the right end of the pinion 104 by a pilot bearing similar to that shown at 134 in FIG. 2 operates concentrically with respect to the axis of the sleeve. Friction between the relatively movable valve lands of the valve assembly is not increased due to radial movement regardless of the magnitude of the rear tooth forces acting on the pinion and on the rack teeth.

Having described a preferred embodiment of my invention, what I claim and desire to secure by U.S. Letters Patent is:

1. A power steering rack and pinion steering gear mechanism for controlling dirigible wheels of a vehicle comprising a steering gear housing, a pinion journalled for rotary oscillation in said housing, a rotary valve sleeve connected mechanically to said pinion and rotatably mounted in said housing, an inner valve member in said sleeve connected to a torque input shaft, said inner valve member being mounted for oscillation rotatably with respect to said sleeve when torque is applied to said shaft, a torsion bar connection between said shaft and said pinion, a steering gear rack engageable with said pinion, said means for mounting said pinion in said housing comprising first and second bearings on either side of said rack, each bearing having an inner race and an outer race and bearing elements situated between the races, each outer race engaging a shoulder on said housing and held by said housing in fixed axial position, one with respect to the other, the inner races for said bearing surrounding said pinion, one inner race being situated adjacent a shoulder formed on said pinion, and an adjusting nut threaded on said pinion and engageable with the other inner race whereby axial forces can be applied to said bearings upon adjustment of said nut thereby maintaining said pinion in concentric relationship with respect to said sleeve.

2. The combination as set forth in claim 1 wherein said spring is a Belleville spring engageable with said one inner race and said pinion shoulder and adapted to establish a separating spring force therebetween.

* * * * *